United States Patent [19]

Olsson

[11] Patent Number: 6,053,294

[45] Date of Patent: Apr. 25, 2000

[54] SYNCHRONIZING DEVICE IN A VEHICLE GEARBOX

[75] Inventor: Ronald Olsson, Partille, Sweden

[73] Assignee: AB Volvo, Gothenburg, Sweden

[21] Appl. No.: 09/202,941

[22] PCT Filed: Jun. 23, 1997

[86] PCT No.: PCT/SE97/01123

§ 371 Date: Feb. 5, 1999

§ 102(e) Date: Feb. 5, 1999

[87] PCT Pub. No.: WO97/49934

PCT Pub. Date: Dec. 31, 1997

[30] Foreign Application Priority Data

Jun. 24, 1996 [SE] Sweden .................................. 9602478

[51] Int. Cl.[7] .................................................. F16D 23/06
[52] U.S. Cl. .................................. 192/53.31; 192/53.34
[58] Field of Search .............................. 192/53.31, 53.34, 192/53.341

[56] References Cited

U.S. PATENT DOCUMENTS

| 4,185,725 | 1/1980 | Maina | 192/53.31 |
| 4,299,317 | 11/1981 | Katayama | 192/53.34 |
| 5,105,927 | 4/1992 | Frost . | |
| 5,135,087 | 8/1992 | Frost . | |
| 5,425,437 | 6/1995 | Nellums . | |
| 5,507,376 | 4/1996 | Skotnicki . | |
| 5,678,670 | 10/1997 | Olsson | 192/53.31 X |

FOREIGN PATENT DOCUMENTS

| 0 663 541 | 7/1995 | European Pat. Off. . |
| 502 042 | 7/1995 | Sweden . |

*Primary Examiner*—Rodney H. Bonck
*Attorney, Agent, or Firm*—Young & Thompson

[57] ABSTRACT

A synchronizer in a vehicle gearbox includes a synchronizing ring and a torque-transmitting element, which transmits a torque from the synchronizing ring to an engaging sleeve in such a manner that the engaging sleeve is imparted an extra force in the engaging direction.

6 Claims, 3 Drawing Sheets

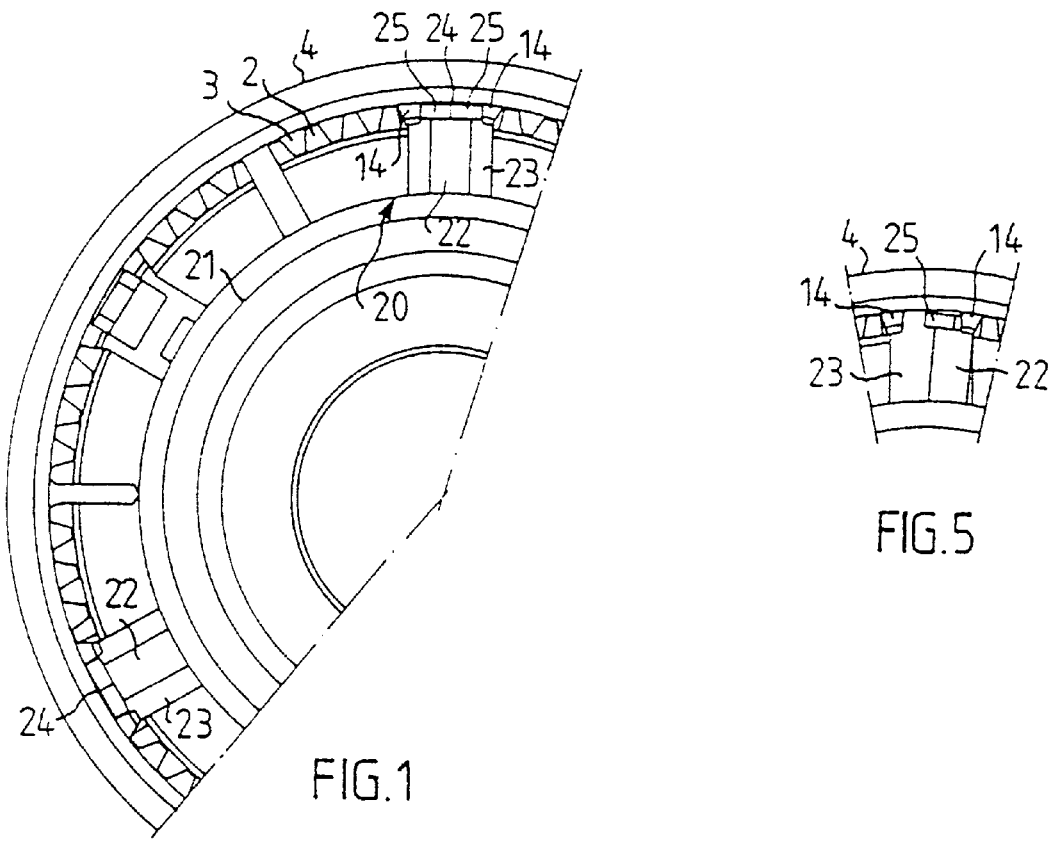
FIG.1
FIG.5
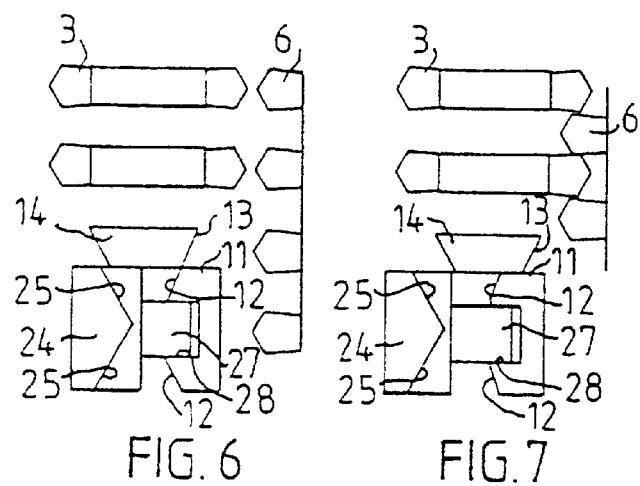
FIG.6
FIG.7

SYNCHRONIZING DEVICE IN A VEHICLE GEARBOX

BACKGROUND OF THE INVENTION

The present invention relates to a synchronizer in a vehicle gearbox, comprising a guide sleeve intended to be non-rotatably joined to a shaft in the gearbox, an engaging sleeve which is non-rotatably, but axially displaceably, mounted on the guide sleeve, an engaging ring provided with exterior engaging teeth and which is intended to be solidly joined to a gear rotatably mounted on said shaft and is lockable relative to the guide sleeve by axial displacement of the engaging sleeve from a neutral position to an engagement position, in which interior engaging teeth on the engaging sleeve engage the exterior teeth on the engaging ring, and a synchronizing ring cooperating with the engaging sleeve and the engaging ring, said synchronizing ring having a conical frictional surface which is movable to engagement with a facing conical frictional surface on the engaging ring.

DESCRIPTION OF THE RELATED ART

In heavy vehicle gearboxes there is often a need to increase the synchronizing torque above what is normally obtained with a common simple synchronization, in order to reduce the shifting effort and eliminate the risk of wear injury to the back and shoulders of professional truck drivers. One method of increasing the synchronizing torque and thus reducing the shifting effort is to arrange a so-called double synchronization, i.e. a synchronizer with two concentric synchronizing rings for each releasable running gear. A double synchronization reduces the shifting effort on the shift lever by about 30% in comparison to a corresponding single synchronization, but it involves an increase in the manufacturing costs of the gearbox which is not insignificant. Another method is to increase the length of stroke of the shift lever to increase the mechanical advantage, but this presupposes that there is space available so that the driver will not risk hitting his knuckles on surrounding components in the cab. A long stroke also creates problems in trucks having the engine and gearbox placed under a tiltable cab.

A third method is to use a pneumatic or hydraulic servo unit but this is an expensive solution.

SUMMARY OF THE INVENTION

The purpose of the present invention is to achieve a synchronizer of the type described by way of introduction, by means of which it is possible, while retaining the short shift length for the gear lever, and without having to use a servo unit, to reduce the shifting force which is necessary to apply to the gear lever, to a fraction of that needed for shifting in hitherto known gearboxes with synchronizers of the type described by way of introduction.

This is achieved according to the invention by virtue of the fact that the synchronizing ring is fixed rotationally relative to a torque-transmitting element, has cam surfaces which cooperate with cam surfaces on the engaging sleeve and which upon relative rotation between the torque-transmitting element and the engaging sleeve—caused by frictional engagement between the frictional surfaces of the synchronizing ring and of the engaging ring—create a force acting on the engaging sleeve in the engaging direction.

The invention is based on the idea of transmitting a portion of the rotational energy of the gearbox itself to the shifting mechanism and in this manner creating a type of integrated servo system which assists the manually initiated and terminated shifting process. In principle, shifting, after manual initiation of the synchronizing process, can be effected entirely by the servo system created. This is, however, in certain cases not desirable since it might cause unintentional shifting.

In a further development of the synchronizer according to the invention, the torque-transmitting element is displaceable away from the synchronizing ring against the effect of a spring force, which in a preferred embodiment is generated by a spring washer package between a surface of the torque-transmitting element and a facing surface on the guide sleeve. By selecting the spring characteristic for the compressed spring package it is possible to limit the force which can be transmitted axially to the engaging sleeve.

BRIEF DESCRIPTION OF THE DRAWINGS

The invention will be described in more detail below with reference to examples shown in the accompanying drawings, where FIG. 1 shows a fragmented end view of a synchronizer according to the invention, FIG. 5 is a fragmented end view with the components in the synchronizing phase, FIGS. 6 and 7 show the components during the twisting loose and engaging phases, respectively.

DESCRIPTION OF THE PREFERRED EMBODIMENTS

Figure 2A:
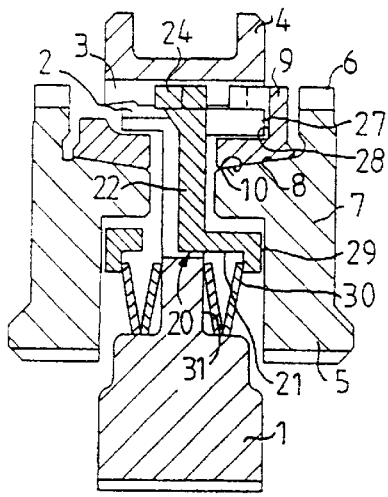
FIGS. 2a and 2b show a longitudinal section and a plan view of the synchronizer in FIG. 1 with the components in the neutral position.

The synchronizer according to the invention comprises a guide sleeve 1 non-rotatably on a shaft (not shown) in a gearbox. The guide sleeve 1 has outer teeth 2, which engage in spaces between inward teeth 3 on an engaging sleeve 4. An engaging ring 5 with outer engaging, teeth 6 is solidly joined to a gear (not shown) rotatably mounted on the shaft. A synchronizing cone 7 with an outer conical frictional surface 8 is joined to the engaging ring 5. A synchronizing ring 9 is arranged concentrically with the synchronizing cone 7 and is provided with a frictional surface 10, which faces the frictional surface 8 of the synchronizing cone 7. In the embodiment shown, the synchronizing ring 9 is provided with blocking elements 11 with cam surfaces 12, which in a known manner cooperate with a cam surface 13 on ramps 14 on the engaging sleeve 4. In addition to the components described, the synchronizer also comprises known spring-loaded locking bodies (not shown).

According to the invention, the torque of the synchronizing ring 9 is transmitted to the engaging sleeve 4 via a torque-transmitting element, generally designated 20, which comprises a sleeve 21 with a number, e.g. three, of arms or fingers 22 received in slots 23 in the guide sleeve 1 and having at their ends heels 24 with V-shaped cam surfaces 25, which cooperate with corresponding cam surfaces 26 on the ramps 14. In the example shown, the cam surfaces 25, 26 form an angle of 60° with the axial direction of the gearbox, but the angle can vary within the interval circa 40°–75°. The cam surfaces 12,13 in the example shown have a somewhat smaller angle relative to the axial direction, but it can also have the same angle as the cam surfaces 25, 26.

Each finger 22 is provided with an axial projection 27 which engages an individual cavity 28 in the synchronizing ring 9. The torque-transmitting ring has a radial flange 29 and a spring washer package consisting of two spring washers 30 lying between the flange 29 and an opposing surface 31 on the guide sleeve 1.

Figure 2B:
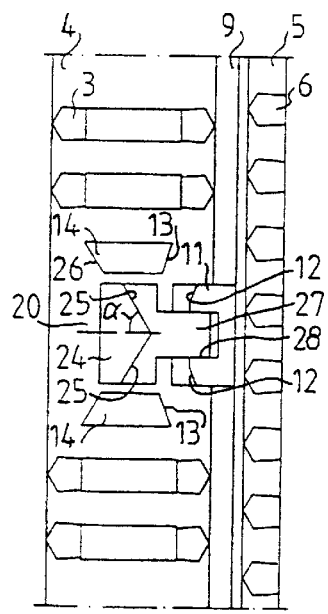
Figure 3:
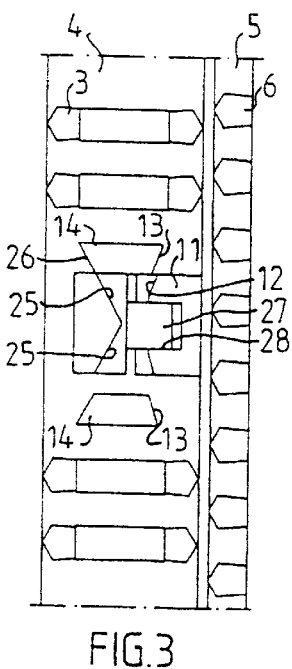
FIG. 3 is a view corresponding to FIG. 2b with the components shown during their blocking phase.

The synchronizer according to the invention functions as follows:

FIGS. 2a and 2b show the various components in the neutral position. When engaging a gear, which means locking a gear (not shown), which is joined to the engaging ring 5 shown at the right of the figure, the engaging sleeve 4 is moved to the right. The synchronization ring 9 is hereby displaced to the right under the influence of the blocking elements (not shown) and its friction surface 10 will come into frictional engagement with the frictional surface 8. The result will be that the synchronizing ring 9 turns and with it the torque-transmitting element 20 (see FIG. 3) so that initially the cam surfaces 25 of the heels 24 will come into contact with the cam surfaces 26 of the ramps 14 (FIG. 3). The torque-transmitting element 20 will gradually turn relative to the engaging sleeve 4, and the cooperating cam surfaces 25, 26 will cause the torque-transmitting element 20 to be pressed backwards, compressing the spring washers 30, so that the components will assume the positions shown in FIGS. 4a, 4b. The springs 30 can in this case be dimensioned so that in the compressed state they exert a force of circa 1500 N in the engaging direction.

Figure 4A:
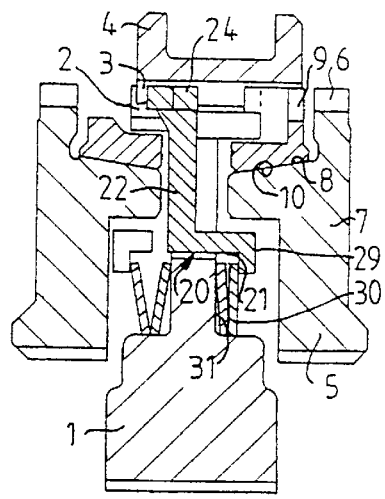
FIGS. 4a and 4b are views corresponding to FIGS. 2a and 2b with the components in the synchronizing phase.
Figure 4B:
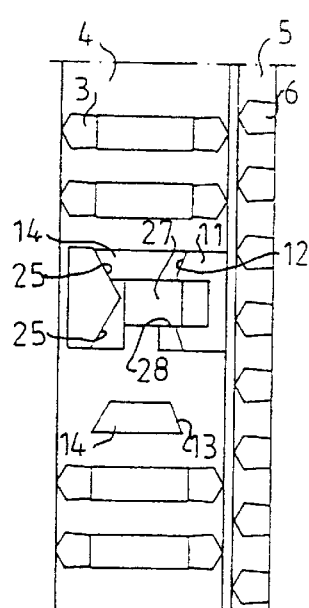

After completed synchronization in accordance with FIGS. 4a, 4b, there will be a twisting loose and engagement as illustrated in FIGS. 6 and 7 under the influence of the force of the spring package 30.

During the process described above, the synchronization itself takes place in a conventional manner by the cam surfaces 13 of the ramps 14, lying closest to the synchronizing ring 9, coming into contact with the corresponding cam surfaces 12 on the blocking elements 11 of the synchronizing ring.

The invention has been described with reference to the components on the right-hand side of the guide sleeve 1. There will of course be the corresponding function when shifting, involving locking of the engaging ring 5 to the left of the guide sleeve 1. The ring 20 of the left-hand torque-transmitting element has fingers (not shown) which are angularly displaced relative to the fingers 22 on the right-hand element 20.

Figure 8A:
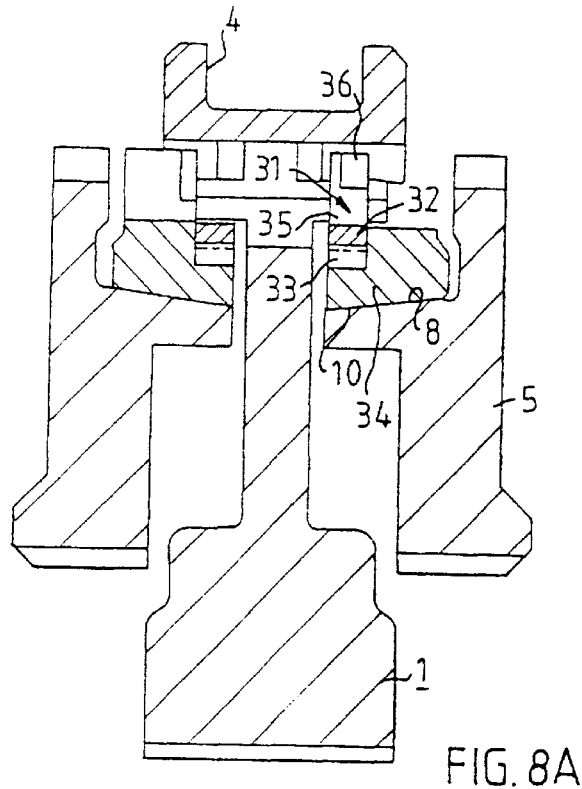
FIGS. 8A and 8B show a longitudinal section and a plan view, respectively, of a second embodiment of a synchronizer according to the invention.
Figure 8B:
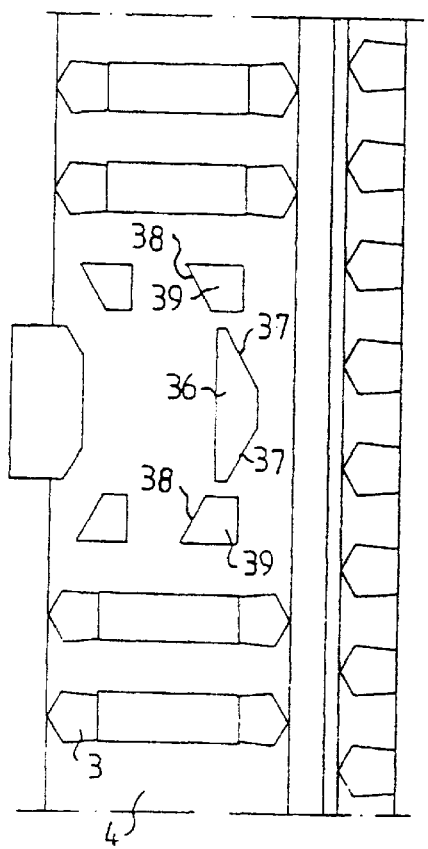

In an alternative embodiment, which is shown in FIGS. 8A and 8B, the synchronizing device is made without the spring washer package. A torque-transmitting element 31, which is simplified in comparison to the element 20, comprises a sleeve 32 with a number, e.g. three, of inner fingers or pins 33, which are axially movable relative to, but rotationally fixed relative to, a synchronizing ring 34 and with a number, e.g. three, of outer fingers or arms 35 which at their ends have heels 36 with V-shaped oriented cam surfaces 37, which cooperate with corresponding cam surfaces 38 on ramps 39 on the engaging sleeve 4. The function is, except for the spring function, analogous to that of the embodiment described above.

What is claimed is:

1. Synchronizer in a vehicle gearbox comprising a guide sleeve, intended to be non-rotatably joined to a shaft in the gearbox, an engaging sleeve which is non-rotatably, but axially displaceably, mounted on the guide sleeve, an engaging ring provided with exterior engaging teeth and which is intended to be securely joined to a gear rotatably mounted on said shaft and is lockable relative to the guide sleeve by axial displacement of the engaging sleeve from a neutral position to an engagement position, in which interior engaging teeth on the engaging sleeve engage the exterior teeth on the engaging ring, and a synchronizing ring cooperating with the engaging sleeve and the engaging ring, said synchronizing ring having a conical frictional surface which is movable to engagement with a facing conical frictional surface on a ring rigidly attached to the engaging ring, means being arranged to amplify the engaging force upon displacement of the engaging sleeve from the neutral position to an engagement position, wherein the synchronizing ring (9;34) is fixed rotationally relative to a torque-transmitting element (20;31), which is axially movable relative to the synchronizing ring and has cam surfaces (25;37) which cooperate with cam surfaces (26;38) on the engaging sleeve (4) and which upon relative rotation between the torque-transmitting element and the engaging sleeve, caused by frictional engagement between the frictional surfaces of the synchronizing ring and the engaging ring, create a force acting on the engaging sleeve in the engaging direction.

2. Device according to claim 1, wherein the torque-transmitting element (20) is movable in the direction away from the synchronizing ring against the effect of a spring force.

3. Device according to claim 2, wherein the torque-transmitting element (20) has engaging teeth (27) engaging grooves (28) in the synchronizing ring (13) and radial fingers (22) received in slots (23) in the guide sleeve (1) and that said cam surfaces (25) are formed at distal ends of the fingers.

4. Device according to claim 3, wherein each finger (22) at its distal end has a heel (24), which is made with a pair of V-oriented cam surfaces (25) facing the synchronizing ring, and that the engaging sleeve (4) for each heel has a pair of cam elements (14), which, in the neutral position, lie on either side of the associated heel and each have a cam surface (26) complementary to the facing cam surfaces (25) on the heel.

5. Device according to claim 3, wherein compression springs in the form of spring washers (30) are arranged between an abutment surface on a sleeve of the torque-transmitting element (20) and a facing surface on the guide sleeve (1).

6. Device according to claim 1, wherein the torque-transmitting element (31) comprises a sleeve (32) with a number of inner fingers (33), which are axially movable relative to, but are rotationally fixed relative to, the synchronizing ring (34), and with a number of outer fingers (35), which at their ends have V-oriented cam surfaces (37) cooperating with the cam surfaces (38) of the engaging sleeve.

* * * * *